(12) United States Patent
Lee et al.

(10) Patent No.: US 6,375,835 B1
(45) Date of Patent: Apr. 23, 2002

(54) OIL RECOVERY SYSTEM

(75) Inventors: Boyoung Lee, 50, Juyeon-dong, Ilsan-ku, Kyunggi-do, 411-370; Jaeyun Jeong, Seoul; Myongsu Kang, Pusan, all of (KR)

(73) Assignee: Boyoung Lee, Koyang (KR)

( * ) Notice: Subject to any disclaimer, the term of this patent is extended or adjusted under 35 U.S.C. 154(b) by 0 days.

(21) Appl. No.: 09/623,528
(22) PCT Filed: Mar. 3, 1999
(86) PCT No.: PCT/KR99/00096
 § 371 Date: Oct. 17, 2000
 § 102(e) Date: Oct. 17, 2000
(87) PCT Pub. No.: WO99/44944
 PCT Pub. Date: Sep. 10, 1999

(30) Foreign Application Priority Data

Mar. 3, 1998 (KR) ............................................. 98-6888
Feb. 6, 1999 (KR) ............................................. 99-4105

(51) Int. Cl.[7] ................................................. C02F 1/40
(52) U.S. Cl. ..................... 210/86; 210/104; 210/115; 210/123; 210/143; 210/242.3; 210/923; 340/624; 73/319
(58) Field of Search ........................... 210/86, 97, 103, 210/104, 115, 121, 123, 143, 170, 242.3, 744, 776, 923; 340/624; 73/291, 314, 319; 116/204, 228

(56) References Cited

U.S. PATENT DOCUMENTS 3,727,765 A * 4/1973 Henning et al. ......... 210/242.3
5,074,053 A * 12/1991 West ...................... 324/207.24
5,108,591 A * 4/1992 Hagan ........................ 210/104
5,154,835 A * 10/1992 DeMichael ................ 210/104

FOREIGN PATENT DOCUMENTS

JP 63236590 A1 * 3/1988

* cited by examiner

Primary Examiner—Joseph W. Drodge
Assistant Examiner—Terry K. Cecil
(74) Attorney, Agent, or Firm—Mathews, Collins, Shepherd and McKay

(57) ABSTRACT

A system for recovering oil from a body of water (e.g. river, lake, or sea) includes (i) an inlet unit 10 having a hopper-shaped main body and floaters 12 attached to the hopper by tugs 11; and (ii) a segregation tank 15 having (a) an inlet pipe 14 to receive oil-contaminated water from the inlet unit, (b) a first discharge pipe 17 with pump 20 therein for delivering oil to an oil tank, and (c) a second discharge pipe 18 for delivering water from the segregation tank. The discharge pipes include respective valves 21, 22 therein. A sensing unit 100 (e.g. ultrasonic transducer) and a panel sensing unit 110 are provided in the segregation tank for determining the level of oil in the tank. A controller including a microprocessor 200 controls the discharge valves 21, 22 in response to signals received from both sensing units 100, 110.

2 Claims, 6 Drawing Sheets

OIL RECOVERY SYSTEM

TECHNICAL FIELD

The present invention relates, in general, to a system used for recovering oil from oil-contaminated water and, more particularly, to a system capable of separating oil from oil-contaminated water of a river, lake or sea into oil and water in accordance with a difference in specific weight between oil and water, the system being operated under the control of a controller so as to receive oil-contaminated water through an inlet and separate oil from the oil-contaminated water in a segregation tank prior to recovering oil, the segregation tank consisting of a plurality of segregation chambers, individually having an oil floating unit or a horizontal oil fence, thus continuously recovering oil from oil-contaminated water.

BACKGROUND ART

In the art, when it is necessary to remove oil from oil-contaminated water of a river, lake or sea, an oil-contaminated area is primarily surrounded by an oil fence so as to prevent a further dispersion of oil. After arranging the oil fence, oil may be removed from water using absorption fabric sheets. The oil may be also removed from water by spreading oil-decomposable or oil-fixing chemicals on the water.

However, the method of removing oil from oil-contaminated water using the absorption fabric sheets is problematic in that it is impossible to use the recovered oil. On the other hand, the method of removing oil from water by decomposing or fixing the oil using chemicals regrettably causes a secondary environmental pollution. Another problem experienced in the typical methods resides in that it is almost impossible to appropriately lay oil fences on a wavy sea. Even though oil fences are set on such a wavy sea, the oil fences fail to effectively segregate the oil-contaminated area from other areas.

DISCLOSURE OF THE INVENTION

Accordingly, the present invention has been made keeping in mind the above problems occurring in the prior art, and an object of the present invention is to provide an oil recovery system, which improves oil recovering efficiency, which recovers oil from oil-contaminated water without using any chemicals, thus being free from causing environmental pollution, and which allows recovered oil to be usable so that the system preferably conserves natural resources.

Another object of the present invention is to provide an oil recovery system, which stabilizes the flow of oil-contaminated water in a segregation tank, thus reducing the processing time for separating oil from water and thereby being continuously operated without being stopped during an oil recovering operation.

In order to accomplish the above objects, the primary embodiment of the present invention provides an oil recovery system, of which the oil-contaminated water inlet unit is designed to effectively float on water. The system thus effectively absorbs oil-contaminated water. The oil-contaminated water is, thereafter, forcibly introduced into a segregation tank by a pumping force of a first pump. The above segregation tank has an inlet port, an oil level sensing unit, a movable panel, a panel sensing unit, and first and second discharge pipes used for separately discharging oil and water from the tank. After an oil recovering process, oil is pumped by a second pump of the first discharge pipe so as to be discharged from the tank into an outside oil tank. The first and second discharge pipes are provided with first and second valves for controlling the flow of oil and water discharged from the tank. The controller receives position signals from the two sensing units prior to controlling the operation of the valves and pumps.

In another embodiment, the system has a four-stage segregation tank provided with first to fourth chambers. In the operation of the system, oil-contaminated water is primarily introduced into the first chamber by a pumping force of a piston pump. In such a case, four oil floating units are provided in the top portion of the first chamber of the tank, so that oil-contaminated water from the piston pump is introduced into the first chamber after passing through the oil floating units. After a primary recovering process, the oil-contaminated water from the first chamber orderly overflows into the second and third chambers so as to be secondarily and finally processed. The second and third chambers individually have a plurality of horizontal diaphragms at a top portion. After a final recovering process, oil free from water flows into the fourth chamber prior to being discharged from the segregation tank into an outside oil tank.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Figure 1:
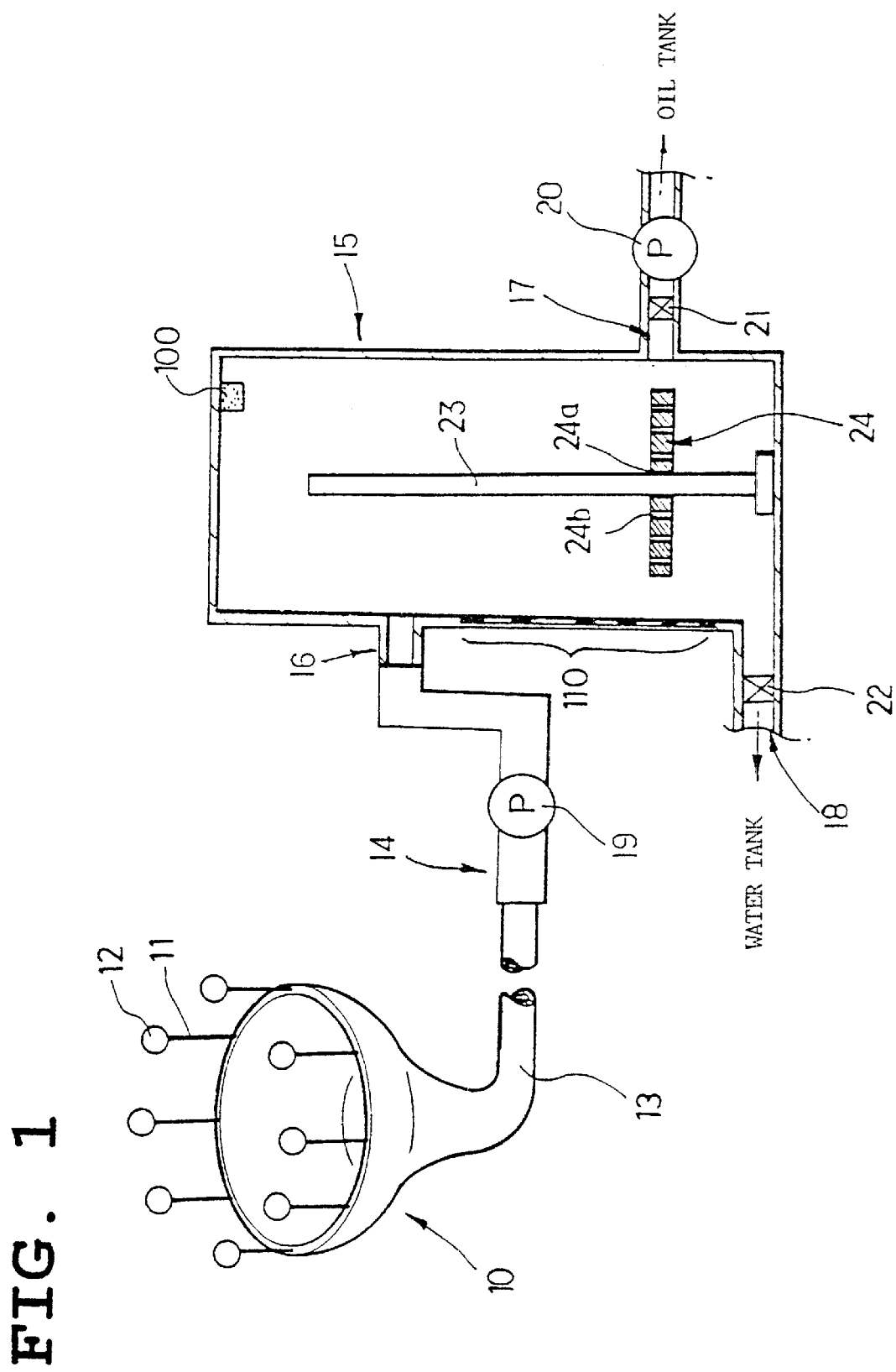
FIG. 1 is a view, showing the construction of an oil recovery system in accordance with the primary embodiment of the present invention.
Figure 2:
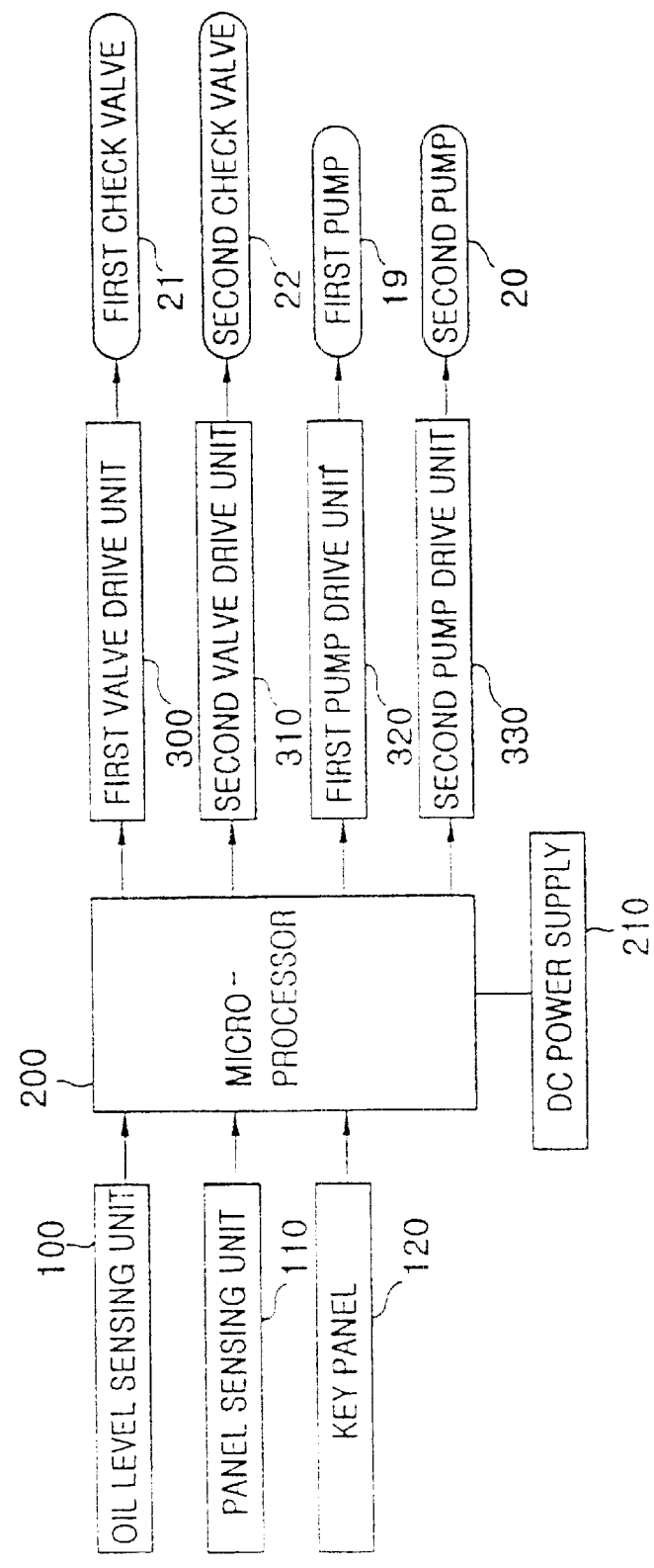
FIG. 2 is a block diagram, showing the construction of a controller for the system of this invention.
Figure 3:
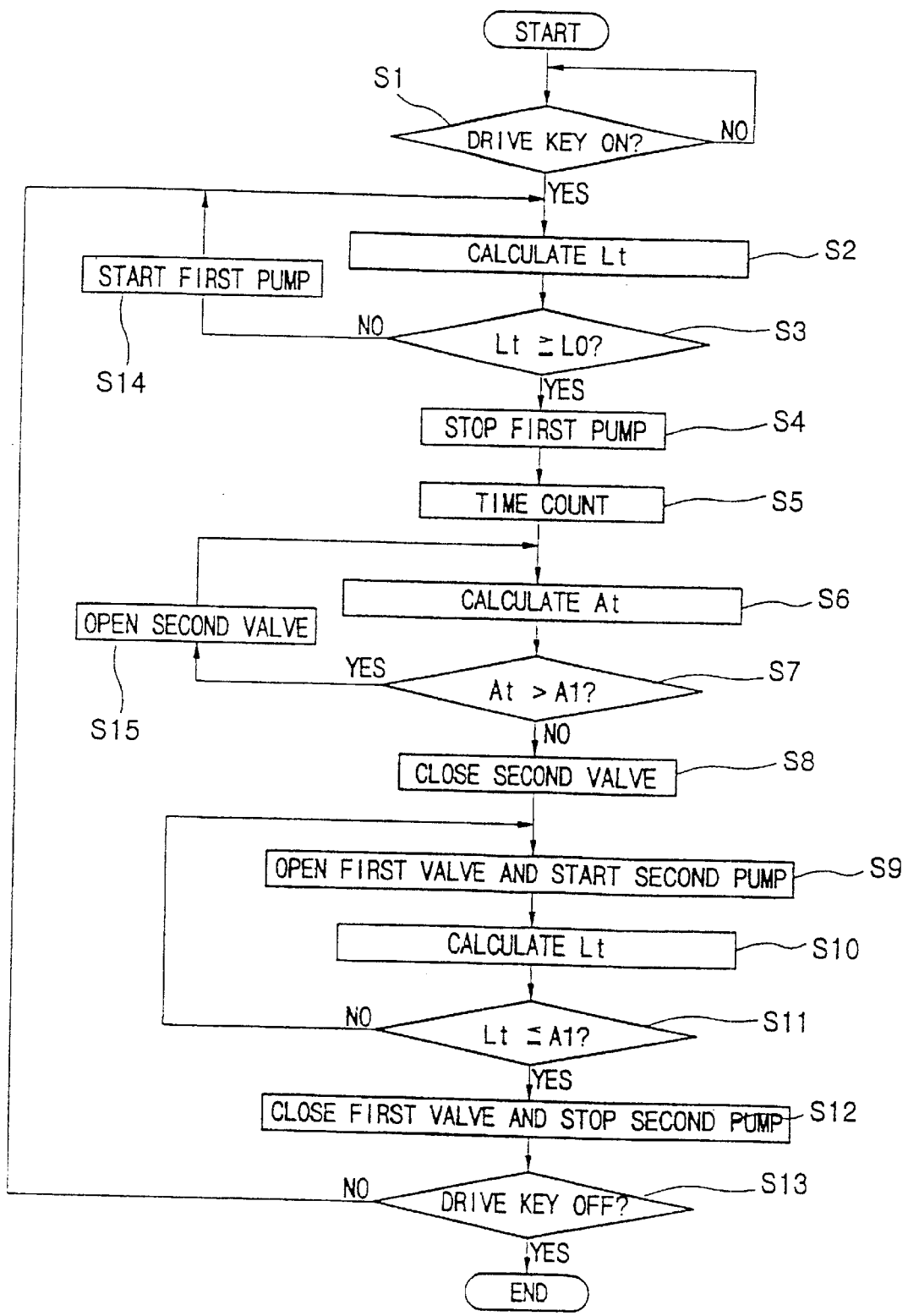
FIG. 3 is a flowchart of the control process for the system of this invention.
Figure 4:
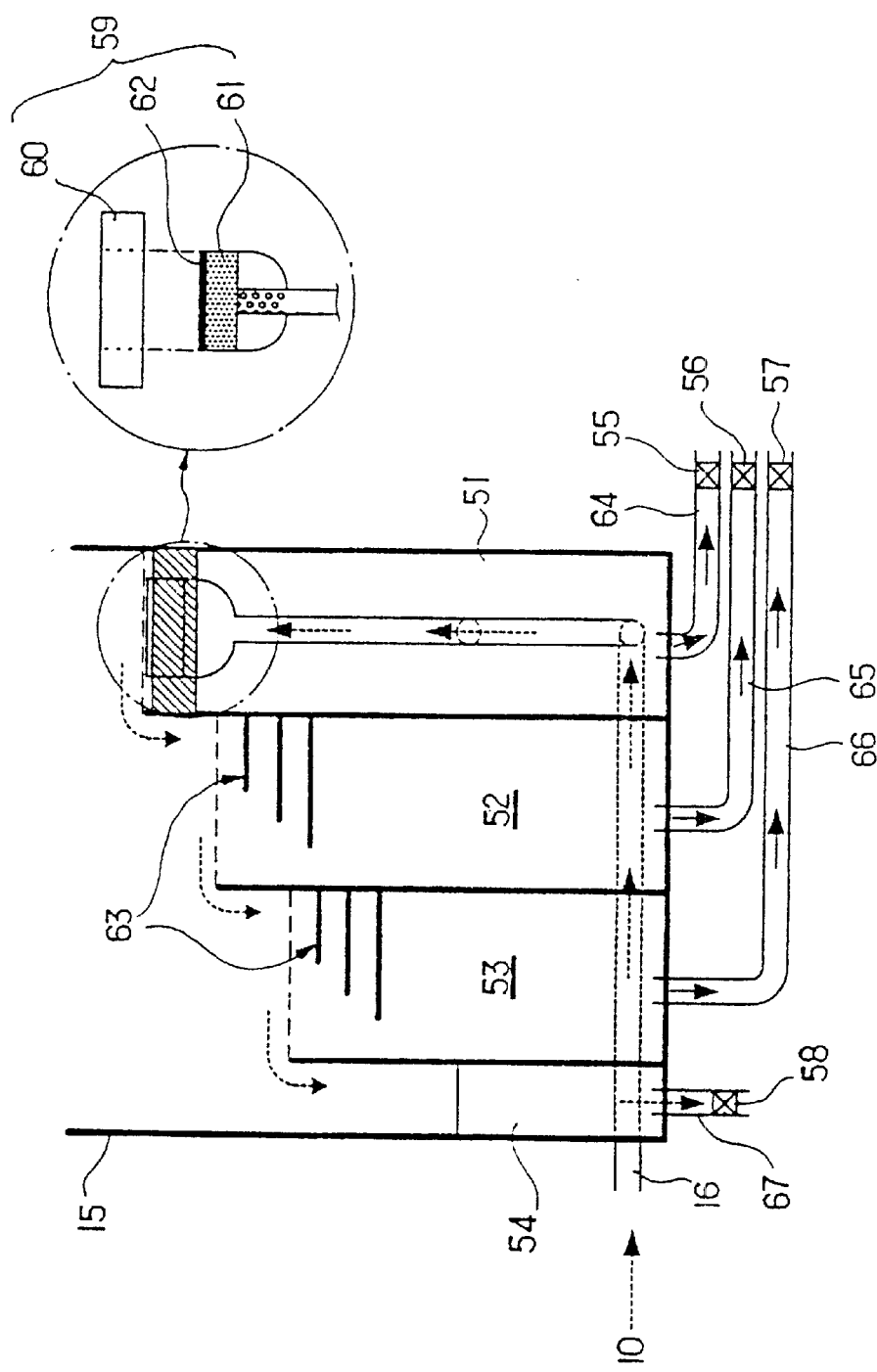
FIG. 4 is a view, showing the construction of an oil recovery system in accordance with the second embodiment of the present invention.
Figure 5:
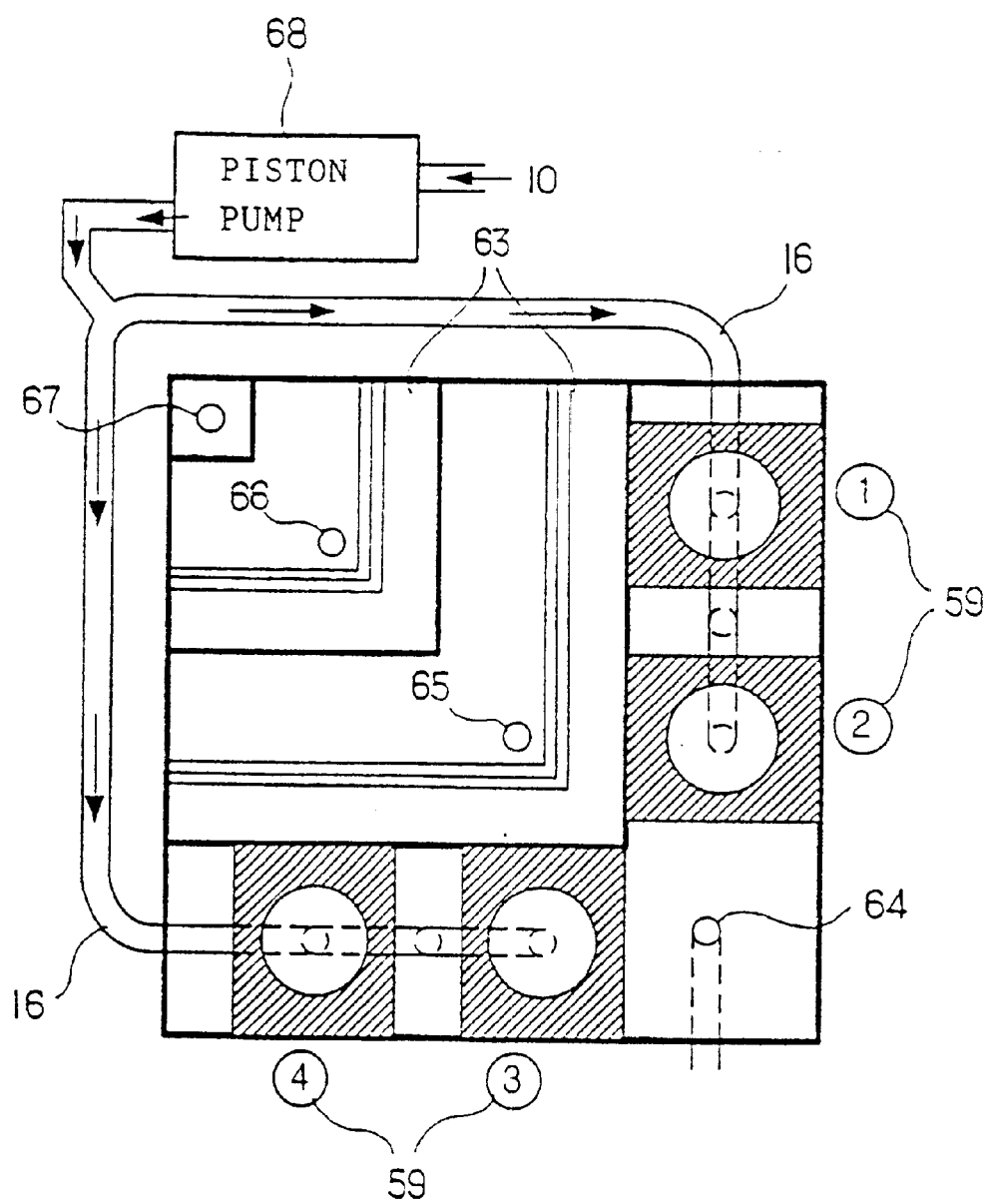
FIG. 5 is a plan view of the oil recovery system of FIG. 4.
Figure 6:
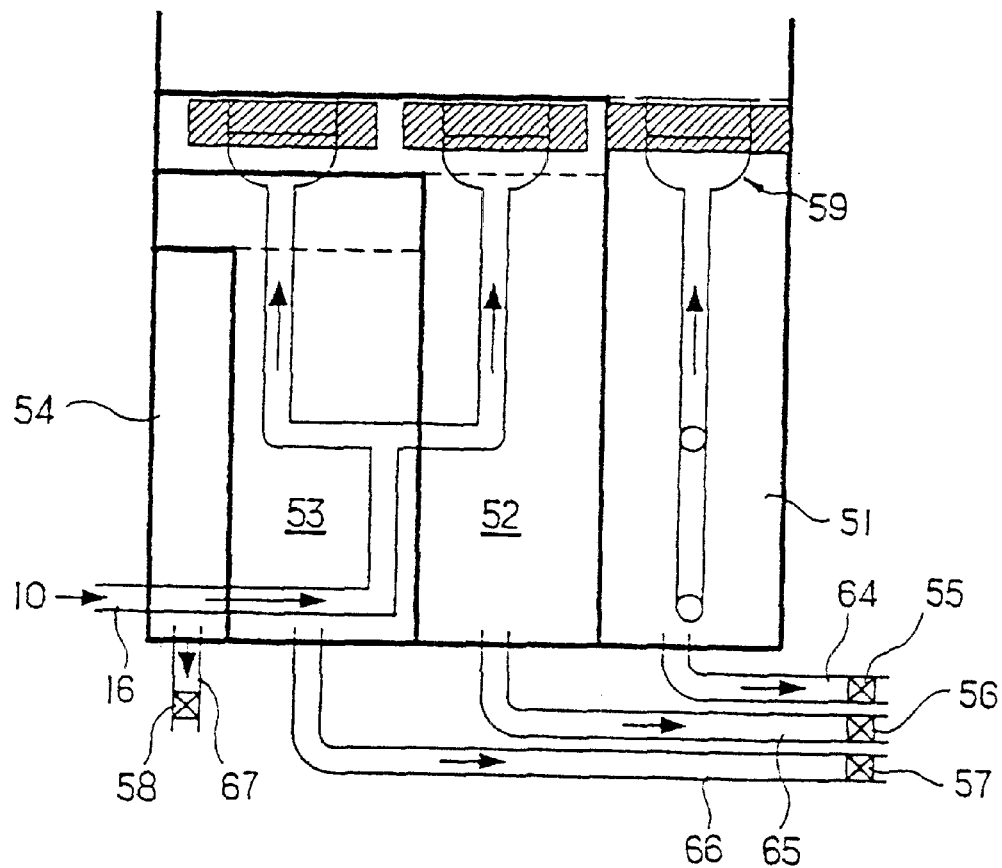
FIG. 6 is a left-hand side view of the oil recovery system of FIG. 5.

FIG. 1 is a view, showing the construction of an oil recovery system in accordance with the primary embodiment of the present invention. FIG. 2 is a block diagram, showing the construction of a controller for the system of this invention. FIG. 3 is a flowchart of the control process for the system of this invention. FIG. 4 is a view, showing the construction of an oil recovery system in accordance with the second embodiment of this invention. FIG. 5 is a plan view of the oil recovery system of FIG. 4. FIG. 6 is a left-hand side view of the oil recovery system of FIG. 5.

As shown in FIGS. 1 and 2, the oil recovery system according to the primary embodiment of this invention comprises an oil-contaminated water inlet unit 10 which floats on the surface of oil-contaminated water so as to receive an oil layer floating on the water surface. The above inlet unit 10 is connected to an inlet port 16 of a segregation tank 15 by a first inlet pipe 14. The segregation tank 15 separates oil from water prior to separately discharging the oil and water. An oil level sensing unit 100 is interiorly mounted to the top wall of the tank 15. The above sensing unit 100 is used for sensing the oil level or the position of an oil layer floating on oil-contaminated water in the tank 15. A fixed column 23 interiorly stands upright on the center of the bottom wall of the tank 15. A movable panel 24 is slidably fitted over the column 23 so as to be vertically movable along the column 23, thus being always positioned at the variable interface between the water and the oil layer in the tank 15. A panel sensing unit 110 is set on the sidewall of the tank 15 so as to sense the variable position of the movable panel 24. Mounted to the first inlet pipe 14 is a first pump 19 which forces the oil-contaminated water to flow from the inlet unit 10 into the tank 15. Two valves 21 and 22 are set on two discharge pipes 17 and 18 of the tank 15, respectively. That is, a first valve 21 is set on an oil discharge pipe or a first discharge pipe 17, thus controlling flow of oil in said pipe 17. On the other hand, a second valve 22 is set on a water discharge pipe or a second discharge pipe 18, thus controlling flow of water in the pipe 18. Mounted to the first discharge pipe 17 is a second pump 20, which forces oil to flow from the tank 15 to an oil tank through the pipe 17. The system also has a controller. The above controller controls the operation of the valves 21 and 22 and pumps 19 and 20 in response to signals output from both sensing units 100 and 110 of the tank 15.

In a detailed description, the inlet unit 10 comprises a main body having a hopper-shaped configuration. A plurality of tugs 11 are regularly attached along the top edge of the hopper-shaped body of the inlet unit 10, with a floater 12 or a plastic ball being mounted to the outside end of each tug 11. The lower portion of the hopper-shaped body has a flexible hose 13 which is connected to the first inlet pipe 14.

The segregation tank 1S has one inlet port 16 and two discharge pipes 17 and 18. The tank 15 receives oil-contaminated water from the first inlet pipe 14 through the inlet port 16 prior to separating oil from the water. The two discharge pipes comprise first and second pipes 17 and 18 used for discharging oil and water from the tank 15 respectively. Both the inlet port 16 and the two discharge pipes 17 and 18 extend outwardly from the sidewall of the tank 15.

The level sensing unit 100 is interiorly mounted to the top wall of the tank 15, thus sensing the oil level or the position of an oil layer floating on the surface of oil-contaminated water in the tank 15. In the preferred embodiment of this invention, the oil level sensing unit 100 comprises an ultrasonic transceiver.

The movable panel 24 is slidably fitted over the vertical column 23. The above panel 24 is designed to be vertically movable along the column 23 and be always positioned at the variable interface between the water and the oil layer in the tank 15 due to a difference in specific weight. In order to allow the panel 24 to perform a desired operational function, the panel 24 has a fitting hole 24a at the center with a plurality of liquid passing holes 24b being regularly formed on the panel 24. The above panel 24 made of a material of which the specific weight ranges from 0.8, or the specific weight of oil, to 1, or the specific weight of water. The movable panel 24 is provided with a magnet.

The panel sensing unit 110, used for sensing the variable position of the movable panel 24 in the tank 15, comprises a plurality of lead switches which are regularly, vertically and interiorly set on the sidewall of the tank 15. Therefore, one of the lead switches is turned on in accordance with a position of the panel 24 in the tank 15, so that the unit 110 senses the position of the panel 15 placed at the interface between water and oil.

In the preferred embodiment of this invention, both the movable panel 24 and the panel sensing unit 110 are used for sensing the position of the interface between water and oil in the tank 15. However, it should be understood that a chemical sensor or an optical sensor may be preferably used in place of both the movable panel 24 and the panel sensing unit 110.

The first pump 19, mounted to the first inlet pipe 14, is used for generating a pumping pressure capable of forcing the oil-contaminated water to flow from the inlet unit 10 into the tank 15.

On the other hand, the second pump 20, mounted to the first discharge pipe 17, is used for generating a pumping pressure capable of forcing oil to flow from the tank 15 to the oil tank through the pipe 17.

The two valves 21 and 22 are set on the first and second discharge pipes 17 and 18 of the tank 15, respectively. The first valve 21 of the first discharge pipe 17 controls flow of oil in the pipe 17, while the second valve 22 of the second discharge pipe 18 controls flow of water in the pipe 18.

The controller, used for controlling the operation of the system, comprises a microprocessor 200. The microprocessor 200 is connected to a DC power supply 210 which is used for supplying DC drive power for the system. Connected to the input terminals of the microprocessor 200 are the oil level sensing unit 100, the panel sensing unit 110 and a key panel 120. The key panel 120 is provided with a plurality of function keys for setting the operational conditions of the system. Upon receiving sensing signals from the two sensing units 100 and 110, the microprocessor 200 operates the signals, thus calculating both the position of an oil layer floating on oil-contaminated water and the position of the interface between oil and water in the tank 15. The microprocessor 200 compares both the oil level and the interface position with preset data prior to outputting valve and pump control signals for the system. The output terminals of the microprocessor 200 are connected to first and second valve drive units 300 and 310, and to first and second pump drive units 320 and 330. The first and second valve drive units 300 and 310 respectively control the operation of the first and second valves 21 and 22 in response to the valve control signals from the microprocessor 200. On the other hand, the first and second pump drive units 320 and 330 respectively control the operation of the first and second pumps 19 and 20 in response to the pump control signals from the microprocessor 200.

The operational effect of the oil recovery system according to the primary embodiment of this invention will be described hereinbelow in conjunction with accompanying drawings.

FIG. 3 is a flowchart of the control process for the system of this invention. The following description is based on assumed conditions with the system of this invention being installed in a ship and being used for recovering oil from oil-contaminated water of a river or sea.

At a step S1, the microcomputer 200 operates a signal output from the key panel 120 so as to determine whether a drive key of the key panel 120 has been turned on. When the drive key has not been turned on (the answer of step S1 is No), the microprocessor 200 repeats the step S1. On the other hand, when the drive key has been turned on (the answer of step S1 is Yes), the microprocessor 200 processes the step S2 so as to calculate an oil level in the tank 15 in response to an oil level Lt signal output from the oil level sensing unit 100. Thereafter, the microprocessor 200 performs a step S3 so as to determine whether the oil level Lt is higher than a preset reference level LO.

When the oil level Lt is higher than the reference level LO (the answer of step S3 is Yes), the microprocessor 200 orderly performs the steps S4 and S5. At the step S4, the microprocessor 200 outputs a stop signal to the first pump drive unit 320 so as to stop the first pump 19. The microprocessor 200 counts a predetermined time at the step S5 prior to performing a next step S6.

At the step S6, the microprocessor 200 calculates the position At of the movable panel 24 or the position of the interface between oil and water by operating a position signal output from the panel sensing unit 110. At a step S7, the microprocessor 200 determines whether the position At of the panel 24 is higher than a preset reference position Al.

When the position At is not higher than the reference position Al (the answer of step S7 is No), this means that the interface between water and oil is positioned just under the first discharge pipe 17 of the segregation tank 15. In such a case, the microprocessor 200 performs a step S8 so as to output a stop signal to the second valve drive unit 310. Upon receiving the stop signal from the microprocessor 200, the second valve drive unit 310 closes the second valve 22. Thereafter, the microprocessor 200 performs a step S9 where the microprocessor 200 outputs start signals to both the first valve drive unit 300 and the second pump drive unit 330. Upon receiving the start signals from the microprocessor 200, the first valve drive unit 300 opens the first valve 21, while the second pump drive unit 330 starts the second pump 20. Therefore, oil, separated from water, is discharged from the tank 15 through the first discharge pipe 23.

At a step S10, the microprocessor 200 operates a signal from the oil level sensing unit 100 so as to calculate the oil level Lt in the tank 15. The microprocessor 200, thereafter, performs a step S11 so as to determine whether the oil level Lt is lower than the preset reference position Al. When the oil level Lt is not lower than the reference position Al (the answer of step S11 is No), the microprocessor 200 performs the step S9. On the other hand, when the oil level Lt is lower than the reference position Al (the answer of step S11 is Yes), this means that the oil level is positioned just under the first discharge pipe 17. In such a case, the microprocessor 200 performs a step S12.

At the step S12, the microprocessor 200 outputs a stop signal to the first valve drive unit 300 so as to close the first valve 21. In addition, the microprocessor 200 outputs a stop signal to the second pump drive unit 330 at the step S12, thus stopping the second pump 20.

At a step S13, the microcomputer 200 operates a signal output from the key panel 120 so as to determine whether the drive key of the key panel 120 has been turned off. When the drive key has been turned on (the answer of step S13 is No), the microprocessor 200 performs the step S2 so as to repeat the above-mentioned process. On the other hand, when the drive key has been turned off (the answer of step 13 is Yes), the microprocessor 200 ends the process.

On the other hand, when the oil level Lt is lower than the reference level LO (the answer of step S3 is No), the microprocessor 200 performs a step S14 so as to output a start signal to the first pump drive unit 320. In response to the start signal from the microprocessor 200, the first pump drive unit 320 starts the first pump 19, thus allowing oil-contaminated water to be introduced into the segregation tank 15. Thereafter, the microprocessor 200 performs the step S2.

When the position At of the movable panel 24 is higher than the reference position Al (the answer of step S7 is Yes), the microprocessor 200 performs a step S15 so as to output a start signal to the second valve drive unit 310. Upon receiving the start signal from the microprocessor 200, the second valve drive unit 310 opens the second valve 22. Thereafter, the microprocessor 200 performs the step S6.

In the preferred embodiment, the system has one segregation tank 15 connected to one oil-contaminated water inlet unit 10. However, it should be understood that two or more segregation tanks 15 may be commonly connected to the single inlet unit 10 so as to perform a continuous oil recovering operation. In such a case, the number of pipes and valves may be increased.

FIGS. 4 to 6 show an oil recovery system in accordance with the second embodiment of this invention. The system according to the second embodiment is different from that of the primary embodiment, shown in FIGS. 1 and 2, as follows. The system of the second embodiment comprises a piston pump 68 connected to an oil-contaminated water inlet unit 10. The segregation tank 15 of the system is a four-stage segregation tank with four chambers 51, 52, 53 and 54 being used for repeatedly separating oil from oil-contaminated water. Of the chambers 51 to 54, the first chamber 51 receives oil-contaminated water pressurized by the piston pump 68. That is, the first chamber 51 is for introducing the oil-contaminated water from the pump 68 into the segregation tank 15. The second and third chambers 52 and 53 are individually provided with a plurality of horizontal shielding diaphragms 63 and one water discharge pipe 65, 66. The fourth chamber 54 is for receiving oil from the third chamber 53. The fourth chamber 54 may be thus called an oil chamber. The system also has a plurality of valves or third to sixth valves 55, 56, 57 and 58. The above valves 55 to 58 are respectively mounted to four discharge pipes extending from the four chambers 51 to 54 so as to control flow of liquid in the discharge pipes.

The above piston pump 68 is for feeding oil-contaminated water from the inlet unit 10 into the first chamber 51 of the four-stage segregation tank 15 while preventing oil from being decomposed into micro particles.

As described above, the segregation tank 15 is a four-stage tank with four chambers 51, 52, 53 and 54. The above tank 15 has one inlet port 16, three water discharge pipes 64, 65 and 66, and one oil discharge pipe 67.

The first chamber 51 is provided with four oil floating units 59. The four oil floating units 59 individually comprise first and second porous filters 61 and 62 through which oil-contaminated water passes. The four oil floating units 59 are interiorly held in the first chamber 51 using holding members 60. The first chamber 51 also has a water discharge pipe 64 at the bottom wall.

Each of the oil floating units 59 has a hopper configuration at the top and comprises first and second porous filters 61 and 62. In the embodiment, sponge is used as the first filter 61, while a sponge cucumber is used as the second filter 62.

On the other hand, the holding members 60, use for holding the four oil floating units 59 in the first chamber 51, are made of sponge or a plate material.

When the four-stage segregation tank 15 is designed, the maximum height of the first chamber 51 is determined depending upon the designing conditions of the third chamber 53 which performs a processing stage prior to the fourth chamber or the oil tank 54. That is, the heights of the first and second chambers 51 and 52 are limited to levels capable of almost completely preventing oil from being discharged from the third chamber 53 through the water discharge pipe during an oil recovering process of the third chamber 53. In addition, it is preferable to limit a difference in height between the four chambers so as to allow oil and water to smoothly overflow.

In order to prevent oil-contaminated water from being discharged from each of the second and third chambers 52 and 53 through an associated water discharge pipe 65, 66, the two chambers 52 and 53 are individually provided with a plurality of multi-stage horizontal shielding diaphragms 63 at a top portion of the sidewall. The water discharge pipes 65 and 66 extend from the bottom walls of the two chambers 52 and 53, respectively.

In the second embodiment of the invention, it is necessary for the segregation tank to be divided into at least three chambers since the tank has to effectively perform an oil recovering operation.

The multi-stage horizontal shielding diaphragms 63 are mounted to the sidewall of each of the second and third chambers 52 and 53 at a top portion. In such a case, the shielding areas of the diaphragms 63 gradually increase from the top diaphragm to the bottom diaphragm.

The fourth chamber 54 receives oil from the third chamber 53. An oil discharge pipe 67 is provided on the bottom wall of the fourth chamber 54.

The third to sixth valves 55 to 58 are respectively mounted to the four discharge pipes 64, 65, 66 and 67 extending from the four chambers 51 to 54 so as to control flow of oil or water discharged from the chambers 51 to 54 through the discharge pipes.

The operational effect of the oil recovery system according to the second embodiment of this invention will be described hereinbelow in conjunction with accompanying drawings.

In the operation of the system, oil-contaminated water is primarily received into the inlet unit 10 prior to being introduced into the first chamber 51 of the segregation tank 15 while being pressurized by the piston pump 68. In such a case, the piston pump 68 does not decompose oil into micro particles different from other typical pumps. In such a case, the oil-contaminated water passes through the four oil floating units 59 while being introduced into the first chamber 51. Each of the oil floating units 59 has a hopper configuration at the top portion and comprises the first and second porous filters 61 and 62 as described above. The operational capacity of the system or the amount of oil-contaminated water to be processed by the system at one time is increased in proportion to the capacity of the piston pump 68.

When the oil-contaminated water reaches the hopper-shaped top portions of the oil floating units 59, the flow ratio of the-oil-contaminated water is suddenly reduced since the cross-sectional area of the flowing passage is quickly increased. In such a case, the oil particles are thickened at the first and second filters 61 and 62 and are slowly pushed to form larger particles. The first filter 61 is held in the hopper-shaped portion of the oil-floating unit 59 by the second filter 62.

The oil floating units 59 are positioned at the same level as the initial water surface of the first chamber 51, thus allowing oil to quickly float on the water's surface. Water, primarily separated from oil, is discharged from the first chamber 51 through the discharge pipe 64 having the third valve 55. It is thus possible to continuously operate the system without stopping the system.

When oil-contaminated water is received into the first chamber 51, the third valve 55 is opened. Water free from oil is thus discharged from the first chamber 51 through the water discharge pipe 64. The system of this invention effectively controls the amount of oil-contaminated water overflowing from the first chamber 51 to the second chamber 52. The second chamber 52 performs the same process as that described first the first chamber 51.

That is, after being primarily processed by the first chamber 51, the oil-contaminated water overflows from the first chamber 51 into the second chamber 52. The oil-contaminated water overflows from the second chamber 52 into the third chamber 53 in the same manner as that described above. Since the second and third chambers 52 and 53 are individually provided with a plurality of multi-stage horizontal diaphragms 63 at a top portion of the sidewall, both the oil layer floating on the water's surface and the oil particles in water cannot reach the water discharge pipes 65 and 66 of the two chambers 52 and 53, but smoothly overflow into next chambers while floating on the water's surface. In addition, the flow of oil-contaminated water into the second and third chambers 52 and 53 is quickly reduced since the shielding areas of the multi-stage diaphragms 63 in the two chambers 52 and 53 gradually increase from the top to the bottom. It is thus possible to prevent the oil-contaminated water in the two chambers 52 and 53 from being turbid.

In the third chamber 53, the fifth valve 57 is selectively opened when the position of the interface between oil and water is higher than a predetermined reference level. However, when the position of the interface between oil and water in the third chamber 53 is not higher than the reference level, the fifth valve 57 is closed. That is, the fifth valve 57 of the third chamber 53 is selectively opened or closed in accordance with the position of the interface between oil and water in said chamber 53.

After being processed by the third chamber 53, oil free from water is introduced from the third chamber 53 into the fourth chamber 54. When the oil level in the fourth chamber 54 is higher than a predetermined reference level, the sixth valve 58 is opened so as to discharge oil from the fourth chamber 54 through the oil discharge pipe 67.

INDUSTRIAL APPLICABILITY

As described above, the present invention provides an oil recovery system. In the oil recovery system, the oil-contaminated water inlet unit has a hopper-shaped configuration suitable for effectively receiving an oil layer from water. The system remarkably improves oil recovering efficiency in comparison with typical recovery systems. The system also recovers oil from oil-contaminated water without using any chemicals, so that the system is free from causing environmental pollution. In the oil recovery system, the segregation tank comprises a plurality of chambers, so that the flow of oil-contaminated water in the segregation tank is stabilized. The system thus reduces the processing time for separating oil from water and is continuously operated without being stopped during an oil recovering operation. Another advantage of the system resides in that recovered oil from the system is usable, thus preferably conserving natural resources.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An oil recovery system, comprising:

an inlet unit used for introducing oil-contaminated water into the system, said inlet unit having a hopper-shaped main body, with a plurality of tugs being individually attached to a top edge of the hopper-shaped main body and individually having a floater at an outside end thereof, said main body also having a flexible hose at a lower portion;

at least one segregation tank connected to said inlet unit through a first inlet pipe, and including an inlet port and first and second discharge pipes extending outwardly from said at least one segregation tank;

an oil level sensing unit interiorly provided at a top portion of said at least one segregation tank and used for sensing a position of an oil layer floating on the oil-contaminated water in said at least one segregation tank;

a fixed column vertically and interiorly mounted to a bottom wall of said at least one segregation tank;

a movable panel slidably fitted over said column at a fitting hole, thus being vertically movable along the column so as to be positioned at an interface between the oil layer and the water, said panel having a plurality of liquid passing holes and a magnet;

a panel sensing unit used for sensing a variable position of said movable panel in the at least one segregation tank, said panel sensing unit comprising a plurality of lead switches regularly, vertically and interiorly set on a sidewall of the at least one segregation tank;

a first pump mounted to said first inlet pipe and used for generating a pumping pressure capable of forcing the oil-contaminated water to flow from the inlet unit into the at least one segregation tank;

first and second valves respectively set on the first and second discharge pipes of the at least one segregation tank, with said first valve being used for controlling flow of oil in the first discharge pipe and said second valve being used for controlling flow of water in the second discharge pipe;

a second pump mounted to said first discharge pipe and used for generating a pumping pressure capable of forcing oil to flow from the at least one segregation tank to an oil tank through the first discharge pipe; and a controller used for controlling both the first and second valves and the first and second pumps in response to signals output from both sensing units.

2. The oil recovery system according to claim 1, wherein said controller comprises:

a key panel provided with a plurality of function keys for setting operational conditions of the system;

a DC power supply used for supplying DC drive power for the system;

a microprocessor connected to the key panel, the oil level sensing unit and the panel sensing unit at input terminals thereof, thus receiving position signals output from both sensing units and comparing the position signals with preset data prior to outputting valve and pump control signals;

first and second valve drive units connected to output terminals of the microprocessor so as to respectively control the first and second valves in response to the valve control signals output from the microprocessor; and first and second pump drive units connected to output terminals of the microprocessor so as to respectively control the first and second pumps in response to the pump control signals output from the microprocessor.

* * * * *